2,354,603

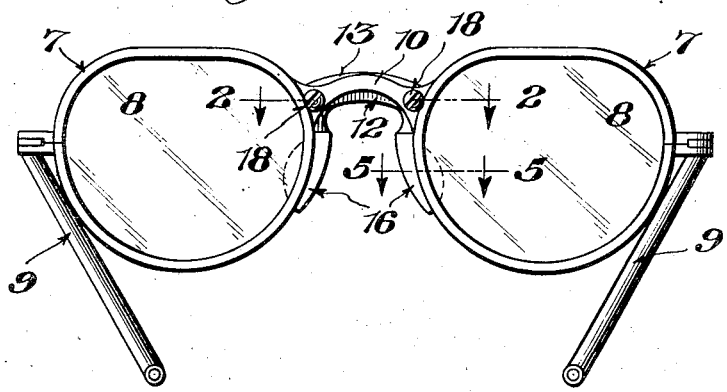
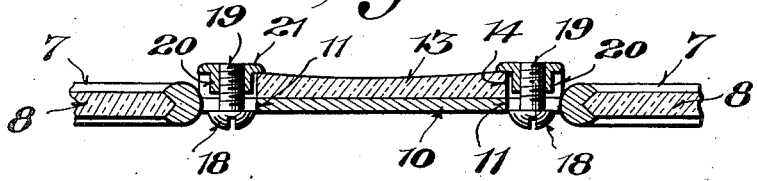
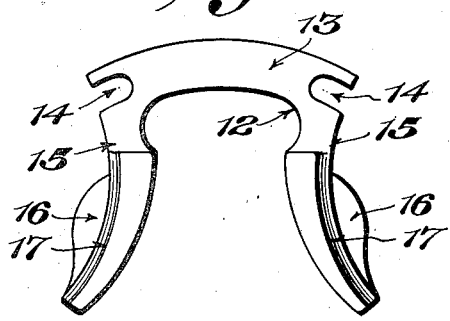
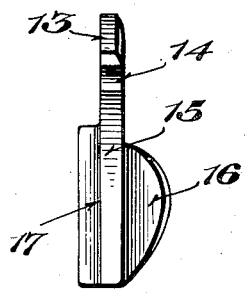
Inventor
Robert Malcom,
By Royal E. Burnham,
Attorney Patented July 25, 1944

UNITED STATES PATENT OFFICE 2,354,603

OPHTHALMIC MOUNTING

Robert Malcom, Chicago, Ill., assignor to Chicago Eye Shield Company, a corporation of Illinois Application June 25, 1941, Serial No. 399,694

2 Claims. (Cl. 88—49)

This invention relates to ophthalmic mountings of the goggle and spectacle types, and particularly to nose pieces thereof.

The pads of nose pieces of ophthalmic mountings as ordinarily made are apt to be broken off in use, and this is especially so when they are used by persons engaged in industrial work where they are subjected to hard usage when on and off the face.

It is an object of the invention to provide such a mounting with a nose piece that easily may be attached to, removed from, and replaced on a mounting when one becomes broken or its usefulness otherwise impaired.

Another object of the invention is to provide a nose piece that easily may be adjusted on and relatively to the bridge of the mounting, so that it may be positioned to rest comfortably on the nose of a user and also to position the lenses properly before the eyes.

The nose pieces of the invention advantageously may be made economically and satisfactorily of non-metallic moldable or other suitable material in the various sizes and proportions required for the varying facial characteristics of persons requiring sight correction and/or protection.

When considered with the description herein, characteristics of the invention are apparent in the accompanying drawing, forming part hereof, which discloses an embodiment for purpose of explanation.

Like reference-characters refer to corresponding parts in the views of the drawing, of which—

Fig. 1 is a front view;

Fig. 2 is a section on line 2—2, Fig. 1;

Fig. 3 is a front view of the nose piece;

Fig. 4 is an end view thereof;

Fig. 5 is a section on line 5—5, Fig. 1;

Fig. 6 is a fragmentary view of the mounting, the nose piece being omitted.

The ophthalmic mountings to which this invention is applicable may be conventional frames of the goggle or spectacle types in so far as they include rims 7 carrying lenses 8, and temples 9. However, a bridge 10 connecting the two rims is flat vertically on the rear side, and has a somewhat triangular opening 11 through each end portion.

The invention provides a nose piece 12, made as a single integral unitary article, that is easily attachable to, adjustable on, and removable from the rear flat side of such a bridge. Preferably, it is made of non-tarnishable strong material such as a suitable type of moldable plastic, but it also may be made of metal or other suitable material if desired.

The nose piece includes a cross member 13, which is of a shape and length corresponding generally to the bridge, and it is substantially coextensive therewith. It has a front flat side that abuts against the bridge throughout its length. The cross member has a transverse slot or opening 14 in each end, which is open to the end and to the front and back surfaces. These slots or openings are in the relative positions of and are registrable with the openings 11 of the bridge.

Arms 15 depend, one at each end, from the cross member 13, and they carry oppositely disposed pads 16 to rest on the nose. The pads project forwardly and rearwardly from the arms. The portion of each pad in front of an arm has a groove 17 in which a lens rim of the mounting may seat.

The nose piece is secured to the bridge by screws disposed transversely therethrough. Each of the screws includes a head 18 normally at the front side and a threaded shank 19 extending through an opening 11 of the bridge. The shank of each screw cooperates with a member that has an interiorly threaded barrel 20 in a slot 14 of the cross member and a head 21 that overlaps the material of the cross member adjacent to the slot. The screws, when turned home in the barrels 20, draw and hold the cross member against the bridge.

The openings 11 in the bridge are larger than the screw shanks 19, and the barrels 20 are of slightly less length than the thickness of the cross member. In view of the fact that the screw shanks are smaller than the openings 11, the cross member may be adjusted, to the extent permitted by relative formation of parts, upwardly, downwardly, and laterally on the bridge before the screws are turned too tight. As the barrels 20 are shorter than the thickness of the cross member, the screws may be turned home to cause their heads and the heads 21 to clamp that member and the bridge firmly together.

When it is desired to remove a nose piece from the mounting, one or both of the screws are turned out and the nose piece released. Ordinarily, it is necessary to remove only one of the screws and to loosen the other, when the nose piece can be withdrawn from the loosened screw.

The invention not only provides a nose piece that easily may be attached to, adjusted on, removed from, and replaced on an ophthalmic mounting, but also one that constitutes a reenforcement to the bridge and lens rims of such a mounting, in that the cross member is clamped against the bridge for its entire length and the lens rims seat in grooves in the nose pads. This factor is of prime importance with goggles and spectacles used by people engaged in manufacturing and other industrial pursuits.

I claim:

1. A nosepiece, for adjustable association with the bridge of an ophthalmic mounting, comprising a cross member having a side to abut against a side of the bridge and nose pads depending therefrom, said cross member having slots extending longitudinally and opening through the ends thereof for reception of fasteners to hold the nosepiece on the bridge.

2. An ophthalmic mounting comprising lens holders, a bridge connecting said holders and having a hole in each end adjacent to a lens holder, a nose piece including nose pads and a cross member carrying said pads and having a side abutting a side of said bridge, said cross member having slots extending longitudinally and opening through the ends thereof and alignable with said holes, and a tightenable and loosenable fastener disposed in each hole-slot pair, said fasteners constituting the sole means connecting said bridge and cross member and the part of each of said fasteners disposed in a hole being smaller than the latter.

ROBERT MALCOM.